United States Patent
Cumpson

(10) Patent No.: US 7,362,527 B2
(45) Date of Patent: Apr. 22, 2008

(54) METHOD AND APPARATUS FOR RETRIEVING DATA

(75) Inventor: Stephen Rodney Cumpson, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 136 days.

(21) Appl. No.: 10/531,031

(22) PCT Filed: Sep. 26, 2003

(86) PCT No.: PCT/IB03/04283

§ 371 (c)(1),
(2), (4) Date: Apr. 12, 2005

(87) PCT Pub. No.: WO2004/036572

PCT Pub. Date: Apr. 29, 2004

(65) Prior Publication Data
US 2006/0041784 A1 Feb. 23, 2006

(30) Foreign Application Priority Data
Oct. 15, 2002 (EP) ................................. 02079299

(51) Int. Cl.
*G11B 5/09* (2006.01)
*G06F 11/16* (2006.01)
*G11B 15/18* (2006.01)

(52) U.S. Cl. ............................. 360/48; 360/53; 714/7
(58) Field of Classification Search .................... None
See application file for complete search history.

(56) References Cited

U.S. PATENT DOCUMENTS

| 6,094,317 | A | * | 7/2000 | Chung | .......................... 360/53 |
| 6,327,679 | B1 | | 12/2001 | Russell | |
| 6,330,641 | B1 | | 12/2001 | Yoshioka | |
| 7,051,154 | B1 | * | 5/2006 | Chng et al. | .................. 711/113 |
| 2001/0021983 | A1 | | 9/2001 | Ono et al. | |
| 2003/0014687 | A1 | * | 1/2003 | Wu | ............................... 714/7 |

FOREIGN PATENT DOCUMENTS

EP 0971358 A2 1/2000

* cited by examiner

*Primary Examiner*—Dwayne Bost
*Assistant Examiner*—Jason Olson

(57) ABSTRACT

A method of retrieving data includes caching data stored in allocation units of a memory (102), preferably a harddisk drive system, of which retrieval incurs a performance penalty. An example of this is data in a spare sector (215), located in a spare area (210) on the harddisk platter (200). The cache memory (103) is, however, a precious commodity. The need for memory space may be reduced by only caching data in spare sectors in which data belonging to a file that is to be retrieved is stored. Also the impact of other kinds of causes of performance penalties may be solved in this way, like those caused by soft defects and fragmentation of files.

7 Claims, 4 Drawing Sheets

METHOD AND APPARATUS FOR RETRIEVING DATA

BACKGROUND OF THE INVENTION

1. Field of the Invention

The invention relates to a method of retrieving data requested by a host from a first memory divided into allocation units.

The invention further relates to an apparatus for retrieving data requested by a host from a first memory, comprising means for receiving data from the first memory, the first memory being divided into allocation units; a second memory; and a central processing unit.

The invention also relates to a system for reproducing audio-visual information.

2. Description of the Related Art

Such a method, apparatus and system are known from U.S. Patent Application Publication NO. 2001/0021983, corresponding to U.S. Pat. No. 6,725,395. This patent proposes a method of relocating defective sectors on a harddisk platter to sectors in a spare area on the platter, and an apparatus for performing this method. According to the method presented in this patent, the spare areas are located outside the data area, either on the outside or inside of the disk platter.

When retrieving data from a group of sectors on the harddisk platter, in which group certain sectors are defective and therefore relocated to sectors in a spare area, the reading head has to switch from an area on the disk platter where the group of sectors is located to either one of the spare areas. Although the patent proposes embodiments for reducing the performance penalty incurred by switching of the head, there will always be a performance penalty when retrieving data from said group of sectors. This is because the reading head will always have to make a switch (or "sweep") from the normal data area to the sectors in the spare area.

This is a disadvantage of the prior art. Harddisk drive systems are more and more used for audio-visual applications, which require optimal real-time performance and bandwidth of such systems. Especially when multiple streams of audio-visual information are streamed from the harddisk drive system—or any other kind of memory device—performance penalties that occur during streaming may cause buffer underflow. When retrieving a stream of audio-visual information for playback, this may result in hiccups in the presentation of the stream on screen. This not only goes for performance penalties caused by out-of-bound relocation of defective sectors, but also for so-called "soft defects", sectors of which data has to be read multiple times before obtaining the correct data.

Furthermore, it is known from practice that files, either data files or streams of audio-visual information, may be stored in fragments on the harddisk platter. Switching from one fragment to another may incur a performance penalty as well, the reading head has to switch from one area on the harddisk platter to another. During this sweep, no data is read.

SUMMARY OF THE INVENTION

It is an object of the invention to further reduce the performance penalties of memories during data retrieval.

This object is achieved by the method according to the invention and is characterized in that it comprises the steps of: determining in which allocation units the requested data is stored; searching a list of references to allocation units to determine whether the list comprises a reference to at least one of the allocation units determined in the previous step; when a reference to at least one allocation unit determined in the first step is comprised in the list, storing a first part of the data stored in the at least one allocation unit in a second memory; and retrieving the requested data, wherein the first part of the requested data is retrieved from the second memory and a second part of the requested data is retrieved from the first memory, the second part of the requested data being complementary to the first part of the requested data.

By caching certain parts of the requested data prior to retrieval of the full amount of data, problems inherent in retrieval of certain parts of the requested data will not occur during retrieval of the full amount of data. One could think of damage done to a disk platter of a harddisk drive, making it difficult to retrieve certain data. When all the requested data is retrieved in a sequence, e.g., in a streaming mode in case of a stream of audio-visual data, and problems occur, the real-time performance of a system using the method according to the prior art may be jeopardized. For example, when a couple of re-read attempts are made during retrieval of data, a buffer-underrun may occur, resulting in a black screen for a user. This kind of problem may be prevented when using the method according to the invention, when building the list from references to allocation units in which data retrieval are known to cause problems like performance penalties.

In an embodiment of the invention, the first memory has a nominal data retrieval rate and the list is built up by using a method comprising the steps of: monitoring an average retrieval rate with which data is retrieved from the first memory; determining whether the average retrieval rate drops below the nominal data retrieval rate; when the average retrieval rate drops below the nominal data retrieval rate, determining a part of the data of which retrieval causes the drop of the average retrieval rate; adding to the list a reference to the allocation units in which data is stored of which the retrieval causes the drop of the average retrieval rate.

It is advantageous to let the list of references to allocation units be set up by an apparatus using the method according to the invention itself. In this way, the method according to this embodiment may be carried out as a background task on the apparatus.

Furthermore, by building the list of references to allocation units by the method according to this invention, the list may be updated. In this way, the method according to the invention also deals with problem allocation units that grow during use of the first memory.

In a further embodiment of the invention, the data is a stream of audio-visual data and the file is retrieved in a sequence dictated by the host.

As already explained, the use of the method according to the invention is advantageous when the requested data is a stream, retrieved in sequence. Playback of this stream may be controlled by the host, by trick-play commands or just by a play command.

The apparatus according to the invention is characterized in that the central processing unit is conceived to: determine in which allocation units the requested data is stored; search a list of references to allocation units to determine whether the list comprises a reference to at least one of the allocation units in which the requested data is stored; when at least one allocation unit in which the requested data is stored is comprised in the list, store the data stored in the at least one allocation unit in a second memory; and retrieve the requested data, wherein a first part of the requested data stored in the second memory is retrieved from the second memory and a second part of the requested data is retrieved from the first memory, the second part of the requested data is complementary to the first part of the requested data.

The system according to the invention comprises the apparatus as described above and the first memory.

BRIEF DESCRIPTION OF THE DRAWINGS

Embodiments of the invention will now be presented by means of Figures, in which.

DESCRIPTION OF THE PREFERRED EMBODIMENTS

Figure 1:
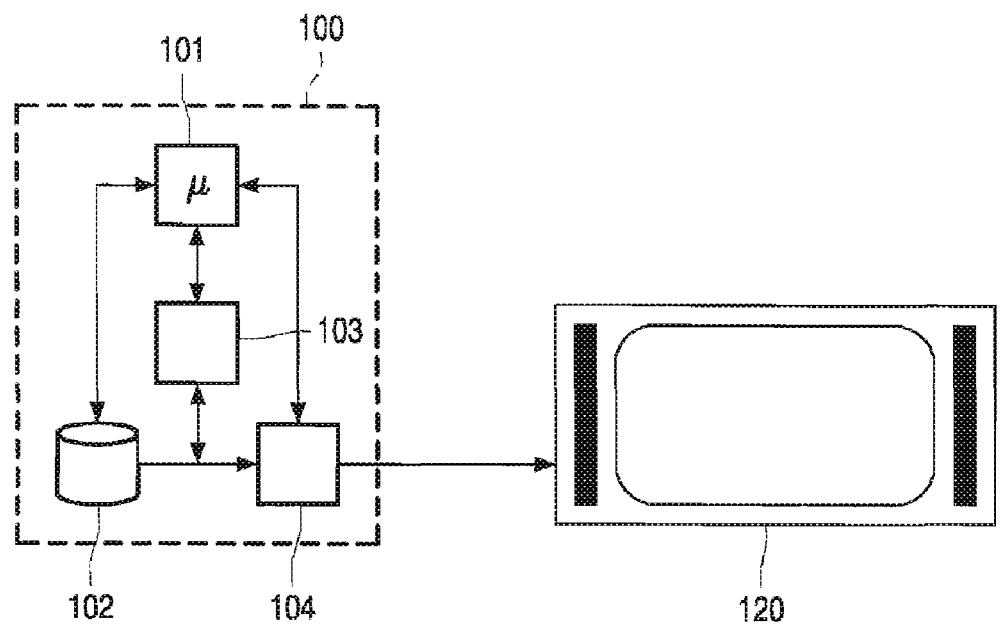
FIG. 1 shows an embodiment of the system according to the invention.

FIG. 1 shows an apparatus 100 as an embodiment of the apparatus according to the invention. The apparatus 100 comprises a central processing unit 101, a harddisk drive system 102, a cache memory 103 and a video processor 104. In this embodiment, the apparatus is adapted to store audio-visual data. To present this audio-visual data, the apparatus may be connected to a TV-set 120.

In a further embodiment of the apparatus according to the invention, the harddisk drive system 102 is replaced by a disc drive conceived to receive an optical or magneto-optical disc, like DVD.

In the retrieval of audio-visual data, delivery of data in time is more important than delivery of faultless data. This is because a little noise in a film presented on the TV-set 120 will, in most cases, be less annoying than a blackout of several seconds because the harddisk drive system 102 is performing several retries to properly retrieve data that may be faulty anyway. Furthermore, data should be delivered constantly and as fast as possible to the video processor 104 to prevent any hiccups in the presentation of the film.

In use over time, the quality of the disk platter in the harddisk drive system 102 degrades. This means that certain sectors—the smallest allocation unit on the disk—may become permanently defective during use of the harddisk drive system 102. It is known in the art that data meant to be stored in such a defective sector is relocated to a spare sector.

Figure 2:
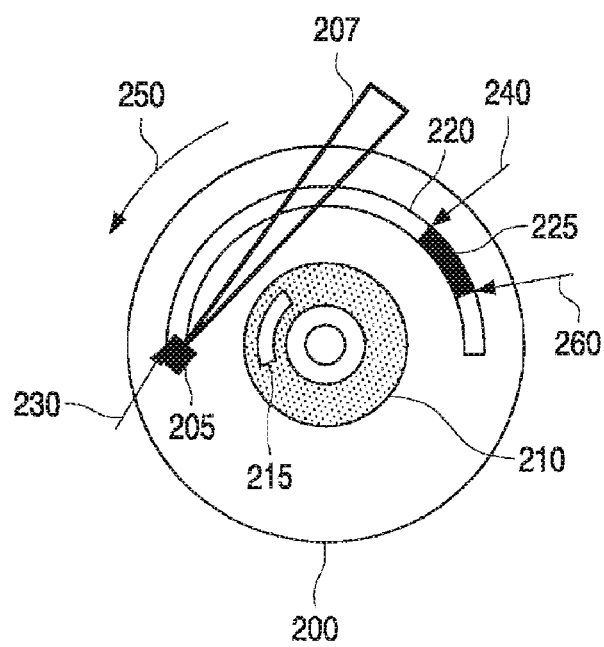
FIG. 2 shows a disk platter with defective sectors relocated to a spare area.

This is shown in FIG. 2. FIG. 2 shows a disk platter 200 with a spare area 210 and a read/write head 205 on an arm 207. The disk platter 200 is a part of the harddisk drive system 102. On the disk platter 200, a stream of audio-visual data is stored in area 220. Area 220 comprises multiple sectors. Area 220 also comprises a defective sector 225. The defective sector 225 has been re-assigned to spare sector 215 in the spare area 210. This re-assignment is administered in a memory (not shown) in the harddisk drive system 102. To the outside world, data is still stored in the defective sector 225; but physically, this data is located in the spare sector 215.

When the stream of audio-visual data stored in the area 220 is retrieved from the disk platter 200, retrieval starts at the location indicated by a first arrow 230. A first part of the stream of audio-visual data between the first arrow 230 and the second arrow 240 can be retrieved easily, because the data is not fragmented. This means that the data can be retrieved in one rotation of the disk platter 200. The disk platter rotates in the direction indicated by a third arrow 250.

However, when the head reaches the defective area 225 to retrieve data that is logically stored there, the arm 207 has to move to the center of the disk platter 200 so the head 205 is able to retrieve data from spare area 215. When the data has been retrieved from the spare sector 215, the arm 207 has to move back to the outside of the disk platter 200 to position the head 205 to a location indicated by a fourth arrow 260 to retrieve the last part of the stream of audio-visual data.

The movement of the arm 207 while retrieving the stream of audio-visual data incurs a considerable performance penalty with respect to retrieval speed, because no data can be retrieved while moving the arm 207.

The performance penalty shows itself as an increased access time and/or an average data retrieval rate that is lower than the nominal data retrieval rate of the harddisk.

This kind of performance degradation may produce hiccups in the retrieval of the stream, causing hiccups in presentation because of buffer underflow, as already explained. The invention proposes a method of reducing this speed penalty and preventing the hiccups. An embodiment of the method according to the invention will be discussed with reference to FIG. 1, FIG. 2 and FIG. 3.

In the embodiment of the invention presented, the microprocessor 101 retrieves a list of defective sectors from the harddisk drive system 102. When a file—like a stream of audio-visual data—is requested for presentation on the TV-set 120, the central processing unit 101 will command the harddisk drive system 102 to retrieve the file from the disk platter 200. This is a starting step 302 in a process depicted by a flowchart 300. In a subsequent process step 304, the central processing unit 101 determines the area 220 where the file is located on the disk platter 200. In a process step 306, the list of defective sectors is checked to see whether the area 220 where the file is to be retrieved contains defective sectors 225. In a decision step 308, it is determined whether this is actually the case.

When the area 220 contains defective sectors 225, the data in the relocated sector 215 is retrieved and stored in the cache memory 103 in a process step 320. Following the process step 320, the file is retrieved from the area 220 in the harddisk drive system 102, until data to be retrieved is located in the spare sector 215. As explained before, the data is logically stored in the defective sector 225 and physically stored in the spare sector 215. When data to be retrieved is located in the spare sector 215, the data retrieved previously from the spare sector 215 is retrieved from the cache memory 103 in a process step 324. Subsequently, in a decision step 326, it is checked whether the file has been fully retrieved. When this is not the case, the process depicted by the flowchart 300 is continued in the process step 322 in which the last part of the file is retrieved. When, in the decision step 326, it is detected that the full file has been retrieved, the process is stopped in a terminator 312.

Since, in the process step 324, the data stored in the relocated sector is retrieved from the cache memory 103, the arm 207 does not have to move to the spare area 210 and the head 205 does not have to be positioned to the spare sector 215. This yields a considerable gain in data retrieval speed of the harddisk drive system 102 as well as of the total apparatus 100.

When, in the decision step 308, it is detected that the area where the file is stored does not contain any defective sectors, the full file is retrieved at once from the harddisk drive system 102. When the file has been fully retrieved, the process is stopped in the terminator 312.

For proper execution of the method described by means of the flowchart 300, it should be known which sectors are relocated or which sectors incur performance penalties in general.

Figure 3:
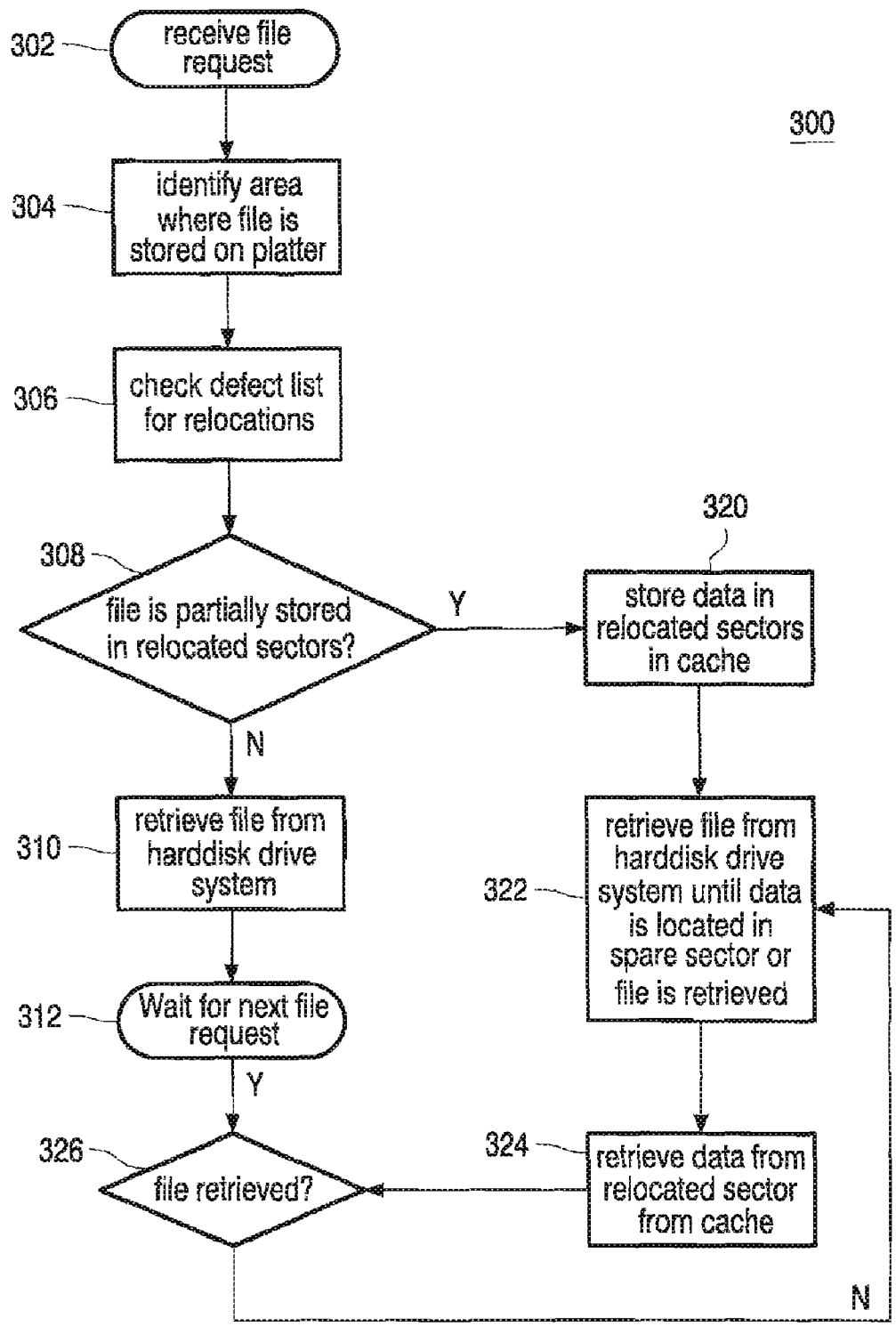
FIG. 3 is a flowchart representing an embodiment of the method according to the invention.
Figure 6:
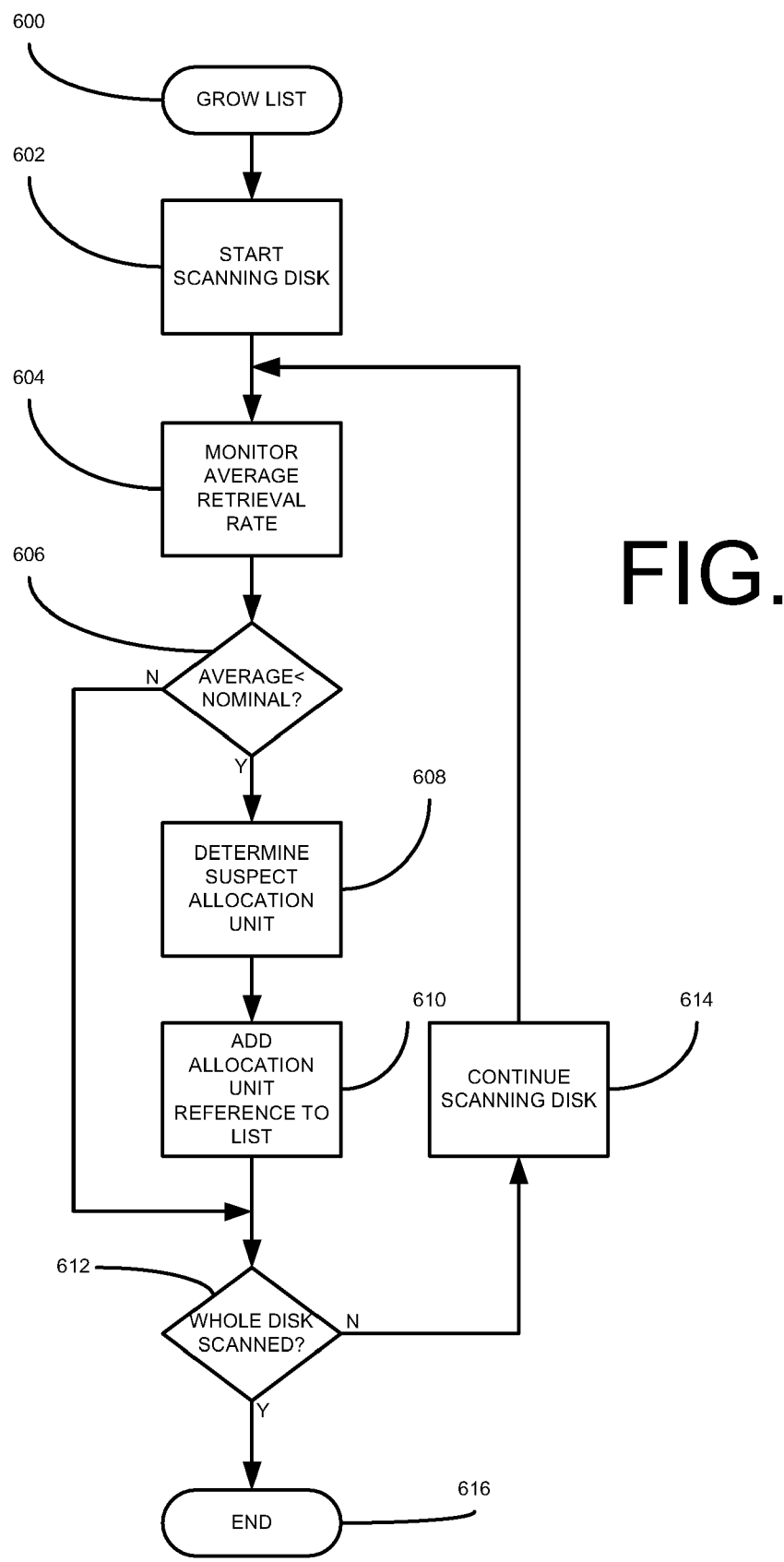
FIG. 6 shows a flowchart representing an embodiment of building the list of references.

It is possible to measure the whole drive, but this is time-consuming. However, this could be done over a prolonged period, preferably when the apparatus conceived to execute the method depicted in FIG. 3 is in an idle mode. In this embodiment of the invention as shown in FIG. 6, the full drive is scanned and the average data retrieval rate is measured. In particular, the process of growing the list 300 begins with step 302 where scanning of the disk is started. The average data retrieval rate is monitored at step 604. When, in step 606 it is determined that the average retrieval rate drops below the nominal retrieval rate of the harddisk drive as specified by the manufacturer, at step 608, this is registered and the address of the sector where data is stored of which the retrieval causes the drop of the average retrieval rate is stored in a list (step 610). In step 612, which is performed after step 610 or after a negative determination in step 606, it is determined whether the whole disk has been scanned. If not, scanning is continued in step 614 and the process reverts to step 604. If the whole disk has been scanned, the process ends at step 616.

A second solution would be to monitor all requests and flag any command that takes longer than expected. Suspect areas comprising data of which the reading and/or writing takes longer than expected could then be further examined, reducing the need to scan the whole disk.

The optimal solution is to get the information from the harddisk drive system itself. Within the HDD, information on relocated sectors is available, but the only problem is how to extract it. For future harddisk systems, this might be possible.

Figure 4:
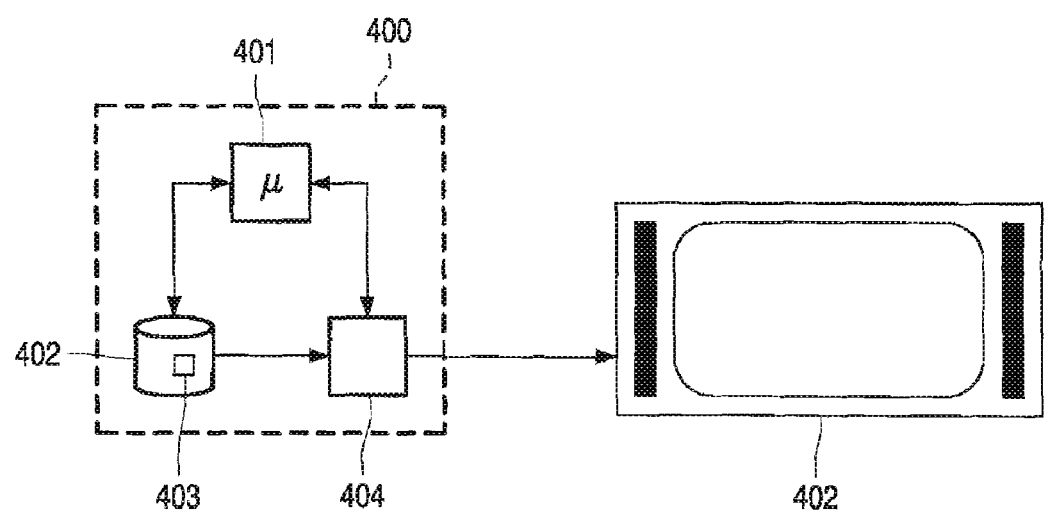
FIG. 4 shows a further embodiment of the system according to the invention.

FIG. 4 shows an apparatus 400 as a further embodiment of the apparatus according to the invention. The apparatus 400 comprises a central processing unit 401, a harddisk drive system 402 and a video processor 404. The apparatus 400 is conceived to retrieve a stream of audio-visual data from the harddisk drive system 402 and process it with the video processor 404. The video processor 440 converts the data received from the harddisk drive system 402 into a signal presentable on a TV-set 420.

The harddisk drive system 402 comprises a cache memory 403. When the harddisk drive system 402 is requested to send a file—in this embodiment a stream of audio-visual information—to the video processor 404, the harddisk drive system 402 checks whether the area on a disk platter of the harddisk drive system 402, where the requested file is stored, contains defective and therefore relocated sectors. The defective sectors are relocated to spare sectors in a spare area on the disk platter. When the area where the requested file is stored contains relocated sectors, the information in the spare sectors is read prior to the retrieval of the full file and stored in the cache memory 403.

When, during the retrieval of the file, data from the relocated sectors should be retrieved, this data is not retrieved from the corresponding spare sectors but from the cache memory 403.

In this embodiment of the invention, the harddisk drive system 402 should know where a full file is stored on the disk platter. This means that the harddisk drive system 402 needs knowledge of the file system of the apparatus 400.

Figure 5:
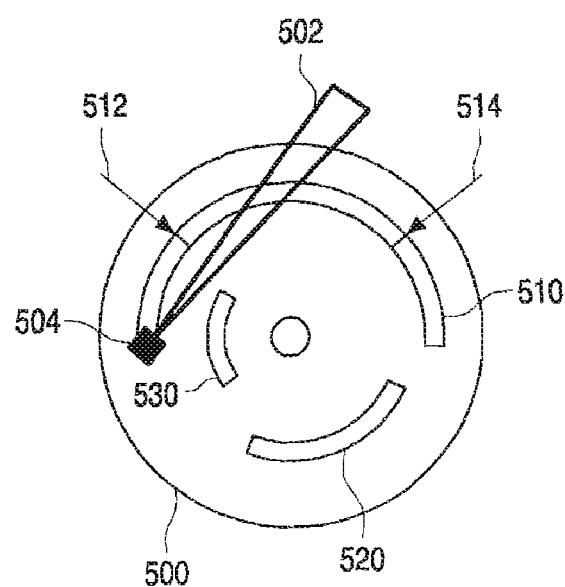
FIG. 5 shows a disk platter with a file stored in fragments.

In the embodiments described, data in spare areas is cached. However, in further embodiments, also data of which reading takes more time to read for any other reason might be cached. An example of this is presented in FIG. 5. FIG. 5 shows a disk platter 500, on which a stream of audio-visual data is stored in fragments, and an arm 502 with a read/write head 504. Fragmented storage may occur when streams are merged or when only little free space is available on the disk platter 500. The stream of audio-visual data is stored in a first area 510, a second area 520 and a third area 530.

Streaming of the data would necessitate the arm 502 with read/write head 504 to skip from the location shown by a first arrow 512 to the second area 520 so as to retrieve data. When data from the second area 520 has been retrieved, the arm and read/write head 504 has to skip again to the location indicated by the first arrow 512 so as to retrieve data from the first area 510 again. This will continue until the read/write 504 head reaches a location indicated by a second arrow 514. When this location is reached, the arm 502 with the read/write head 504 has to skip to the third area 530. When the data from the third area 530 has been retrieved, the arm 502 has to skip back to the location indicated by the second arrow 514 to retrieve the last data of the stream from the first area 510.

The skipping of the arm 502 and the read/write head 504 consumes a considerable amount of time. When, prior to the retrieval of the stream of audio-visual information, the data stored in the second area 520 and the third area 530 is cached, retrieval of the stream requested can be done faster than in the conventional way.

In a further embodiment of the invention, only data stored in the first part of the second area 520 and the data in the first part of the third area 530 is cached prior to retrieval of the full stream of audio-visual data. In this way, the gap in information retrieval by the harddisk drive system caused by switching of the arm 502 is filled by retrieving data from the cache memory. This reduces the need for memory space in the cache as compared to the previous embodiment.

Also, other performance penalties, like soft defects, may be considered for caching prior to streaming a file. Soft defects occur at locations where the quality of the disk platter is degrading, but where data can still be read after a few retries. In this way, soft defects cause performance penalties as well.

Of course, retrieval and caching of spare sectors consumes time, just as sweeping of an arm with a read/write head during retrieval of the full stream. However, current disk platters have a fairly good quality and they do not degrade very fast, and only few sectors have to be relocated to spare sectors in a spare area. Therefore, it will only take a few hundred milliseconds to cache data that is stored in spare sectors, at start-up. Most users prefer some delay at start-up over hiccups during display of the audio-visual data.

The embodiments described above are merely illustrative for the broader scope of the invention and are not limitative. For example, any person skilled in the art will understand that the method according to the invention may be applied to other kinds of memories as well, like opto-magnetic discs, optical discs like CD, SACD, DVD and Blue-Ray and the like.

In summary, the invention relates to a method of caching data stored in allocation units of a memory (102), preferably a harddisk drive system, of which retrieval incurs a performance penalty. An example of this is data in a spare sector (215), located in a spare area (210) on the harddisk platter (200). The cache memory (103) is, however, a precious commodity. The need for memory space may be reduced by only caching data in spare sectors in which data belonging to a file that is to be retrieved is stored. Also the impact of other kinds of causes of performance penalties may be solved in this way, like those caused by soft defects and fragmentation of files.

The invention claimed is:

1. A method of retrieving possibly fragmented data requested by a host from a first memory divided into allocation units, and for supplying said retrieved data as a data stream, characterized in that the method comprises the steps of:

preliminary to retrieving the requested data, determining in which allocation units of the first memory the requested data is stored;

searching a list of references to defective allocation units of the first memory to determine whether the list contains a reference to at least one of the allocation units determined in the preceding step;

when a reference to at least one allocation unit determined in the determining step is contained in the list, storing, as a first part of the requested data, the data stored in the at least one allocation unit in a second memory; and retrieving the requested data by retrieving the first part of the requested data from the second memory and retrieving a second part of the requested data from the first memory, the second part of the requested data being complementary to the first part of the requested data, and supplying the first and second parts as a data stream, wherein the first memory has a nominal data retrieval rate and the list is built up by using a method comprising the steps of:

monitoring an average retrieval rate with which data is retrieved from the first memory;

determining whether the average retrieval rate drops below the nominal data retrieval rate;

when the average retrieval rate drops below the nominal data retrieval rate, determining a part of the data of which retrieval causes the drop of the average retrieval rate; and adding to the list a reference to the allocation units in which data is stored of which the retrieval causes the drop of the average retrieval rate.

2. The method as claimed in claim 1, wherein the list comprises references to re-assigned allocation units.

3. The method as claimed in claim 1, wherein the requested data is stored in fragments in the first memory and the list comprises references to a predetermined number of allocation units of each fragment.

4. The method as claimed in claim 1, wherein the list comprises references to allocation units from which data cannot be retrieved in one read operation.

5. The method as claimed in claim 1, wherein the data is a stream of audio-visual data and the file is retrieved in a sequence dictated by the host.

6. An apparatus for retrieving possibly fragmented data requested by a host from a first memory, and for supplying said retrieved data as a data stream, the apparatus comprising:

A first memory divided into allocation units, said first memory having a nominal data retrieval rate;

means for receiving data from the first memory;

a second memory; and a central processing unit;

characterized in that the central processing unit is programmed to:

preliminary to retrieving the requested data, determine in which allocation units in the first memory the requested data is stored, search a list of references to defective allocation units of said first memory to determine whether the list contains a reference to at least one of the allocation units in which the requested data is stored, and when at least one allocation unit in which the requested data is stored is contained in the list, store the data stored in the at least one allocation unit in the second memory; and retrieve the requested data by retrieving a first part of the requested data stored in the second memory from the second memory and retrieving a second part of the requested data from the first memory, the second part of the requested data being complementary to the first part of the requested data, and supply the first and second parts as a data stream, wherein the list is built up by the central processing unit by:

monitoring an average retrieval rate with which data is retrieved from the first memory;

determining whether the average retrieval rate drops below the nominal data retrieval rate;

when the average retrieval rate drops below the nominal data retrieval rate, determining a part of the data of which retrieval causes the drop of the average retrieval rate; and adding to the list a reference to the allocation units in which data is stored of which the retrieval causes the drop of the average retrieval rate.

7. The apparatus as claimed in claim 6, wherein the first memory is a harddisk drive system and second memory is a solid-state memory.

* * * * *